US012345655B1

(12) United States Patent
Zhang et al.

(10) Patent No.: US 12,345,655 B1
(45) Date of Patent: Jul. 1, 2025

(54) SUBSURFACE DEFECT DETECTING DEVICE FOR CYLINDRICAL COMPONENTS AND METHOD THEREOF

(71) Applicants: TAIYUAN UNIVERSITY OF TECHNOLOGY, Taiyuan (CN); State Grid Shanxi Electric Power Research Institute, Taiyuan (CN)

(72) Inventors: Yanjie Zhang, Taiyuan (CN); Zhiqi Xu, Taiyuan (CN); Tao Wang, Taiyuan (CN); Lu Bai, Taiyuan (CN); Wei Wang, Taiyuan (CN); Hong Liu, Taiyuan (CN); Lixin Wu, Taiyuan (CN); Maosen Yin, Taiyuan (CN); Zhihui Xu, Taiyuan (CN); Yaxing Liu, Taiyuan (CN)

(73) Assignees: TAIYUAN UNIVERSITY OF TECHNOLOGY, Taiyuan (CN); State Grid Shanxi Electric Power Research Institute, Taiyuan (CN)

( * ) Notice: Subject to any disclaimer, the term of this patent is extended or adjusted under 35 U.S.C. 154(b) by 0 days.

(21) Appl. No.: 18/981,467

(22) Filed: Dec. 14, 2024

(30) Foreign Application Priority Data

Apr. 23, 2024 (CN) .......................... 202410490871.X

(51) Int. Cl.
  *G01N 21/88* (2006.01)
  *G01N 21/17* (2006.01)
(52) U.S. Cl.
  CPC ..... *G01N 21/8806* (2013.01); *G01N 21/1702* (2013.01); *G01N 2021/1706* (2013.01); *G01N 2201/104* (2013.01)
(58) Field of Classification Search
  CPC ........... G01N 21/8806; G01N 21/1702; G01N 2021/1706; G01N 2201/104
  See application file for complete search history.

(56) References Cited

U.S. PATENT DOCUMENTS

| | | | |
|---|---|---|---|
| 5,608,166 A | 3/1997 | Monchalin et al. | |
| 6,333,485 B1 | 12/2001 | Haight et al. | |
| 10,492,709 B2 | 12/2019 | Audeh et al. | |
| 2003/0078681 A1 | 4/2003 | Dubois et al. | |
| 2012/0048021 A1* | 3/2012 | Ochiai ................. | G21C 17/017 73/643 |

FOREIGN PATENT DOCUMENTS

| | | |
|---|---|---|
| CN | 101819163 A | 9/2010 |
| CN | 101825498 A | 9/2010 |

(Continued)

OTHER PUBLICATIONS

English translation for CN-107747922-B (Year: 2020).*

(Continued)

*Primary Examiner* — Lee E Rodak
*Assistant Examiner* — Byung Ro Lee

(57) ABSTRACT

A subsurface defect detecting device for cylindrical components and method thereof are provided. The subsurface defect detecting device for cylindrical components includes: an electric rotating platform, a three-jaw chuck, a first linear supporting base, and a second linear supporting base. The three-jaw chuck is mounted on the electric rotating platform, and the three-jaw chuck is configured to fix a workpiece to be detected. The first linear supporting base and the second linear supporting base are arranged close to the electric rotating platform, and the first linear supporting base and the second linear supporting base are in contact with each other and are perpendicular to each other. The present disclosure achieves optimal laser ultrasound detection angles by incorporating a moving device, determining the appropriate laser ultrasound detection angle for cylindrical components with different curvature radii, thereby reducing the impact of uneven surfaces on the detection results.

4 Claims, 11 Drawing Sheets

(56) References Cited

FOREIGN PATENT DOCUMENTS

| CN | 102175775 | A |   | 9/2011  |     |           |
|----|-----------|---|---|---------|-----|-----------|
| CN | 109115804 | A |   | 1/2019  |     |           |
| CN | 107747922 | B | * | 5/2020  | ....| G01B 17/00 |
| CN | 109668838 | B | * | 7/2020  | ....| G01N 21/1702 |
| CN | 113008803 | A |   | 6/2021  |     |           |
| EP | 2148197   | B1| * | 11/2012 | ....| F22B 37/003 |

OTHER PUBLICATIONS

English translation for CN-109668838-B (Year: 2020).*

Ma Qijun; Danqi; Xie Jing; Shi Yifei; Shen Zhonghua, Experimental study of the surface notches detection on cylinder by means of scanning laser line source, Laser Technology, No. 01, Feb. 25, 2009.

Chai Huayou; Li Tianbin; Zhang Dianji; Chen Jian; Wu Qiaoyun; Chai Xiuwei, Effect of surface permeability of saturated porous media on behaviour of surface waves using thin layer method, Rock and Soil Mechanics, No. 12, Dec. 31, 2016.

Clorennec D, Nondestructive evaluation of cylindrical parts using laser ultrasonics, Ultrasonics, vol. 40, No. 1, May 1, 2002.

Tang Wenhan et al., Analysis and optimization of underwater laser communication signal characteristics, Laser Journal, No. 12, Dec. 25, 2019.

Dai Lichao et al., Damage identification of concrete structure based on WPT-SVD and GA-BPNN, Journal of Zhejiang University (Engineering Science), vol. 57, No. 1, Jan. 3, 2023.

Zhang Yanjie, Research on Photoacoustic Synthetic Aperture Focusing Technology Imaging Method of Internal Defects in Cylindrical Components, Sensors, vol. 23, No. 15, Aug. 29, 2023.

* cited by examiner installing the workpiece to be detected, and establishing a plane rectangular coordinate system (x-y) with an intersection of the first linear supporting base and the second linear supporting base as a coordinate origin, and the first linear supporting base is located on the y-axis, and the second linear supporting base is located on the x-axis; and setting coordinates of the first electric telescopic rod in the x-y plane rectangular coordinate system to (0, y), and setting coordinates of the third electric telescopic rod in the x-y plane rectangular coordinate system to (x, 0), and setting coordinates of the workpiece to be detected in the x-y plane rectangular coordinate system to ($x_0$, $y_0$) — S1 based on the first amplitude-frequency relationship, determining two time domain relationships and two second amplitude-frequency relationships by a simulation analysis — S2 performing a layer-by-layer scanning of the workpiece to be detected through a cooperation of the electric rotating platform, the first electric telescopic rod, and the third electric telescopic rod, while synchronously recording rotational angles and measurement heights of the workpiece to be detected and corresponding laser ultrasonic signals — S3 analyzing collected laser ultrasonic signals by the PC terminal, and determining whether the workpiece to be detected has the subsurface defect by observing variations in positive peak values of the Rayleigh wave in the collected laser ultrasonic signals; and calibrating a location of the subsurface defect based on the workpiece rotation angles and the measurement heights; and calibrating a subsurface defect depth $d$ by calculating a depth feature value $P_r$ of the Rayleigh wave in the laser ultrasonic signals; and extracting positive peak value $R_{pos}$ and negative peak value $R_{neg}$ of the Rayleigh wave in the laser ultrasonic signals, and calculating a subsurface defect width $w$ — S4 outputting subsurface defect information of the workpiece to be detected, and the subsurface defect information comprises whether the subsurface defect is present, the location of the subsurface defect on the workpiece to be detected, the subsurface defect depth, and the subsurface defect width — S5

FIG. 11 driving the workpiece to be detected to rotate in steps by the electric rotating platform, with each step involving a specific rotation angle of $\Delta\theta=2°$; after each step, the pulse laser is controlled to emit a pulse laser through the pulse laser focusing probe; and collecting the laser ultrasound signals from current position by the continuous laser focusing probe; and converting the laser ultrasound signals into electrical signals by the dual-wave mixing interferometer and the electrical signals are transmitted to the PC terminal; and the PC terminal is configured to store the laser ultrasound signals and records the corresponding rotation angles and measurement heights of the workpiece to be detected, until $n \cdot \Delta\theta=360°$ — S3.1 synchronously shorting the first electric telescopic rod and the third electric telescopic rod in steps, with each step having a specific shortening distance of $\Delta h=5mm$; performing a judgment according the following inequality $h > h_0$; if the inequality holds, the subsurface defect detection of the workpiece to be detected is not completed, and performing S3.1 and S3.2 repeatedly; if the inequality does not hold, the subsurface defect detection of the workpiece to be detected is considered complete — S3.2

FIG. 14 performing a wavelet packet decomposition to the laser ultrasonic signal, and the laser ultrasonic signal φ(t) is expressed as:

$$C_{i,k}^j = \int \varphi(t) \cdot W_{i,k}(t) dt;$$

$$W_{i,k}(t) = 2^{-i/2} W(2^{-i} t - k)$$

— S4.3.1

↓ constructing a time-frequency matrix $A$ of the laser ultrasonic signal that contains information about subsurface defect through the wavelet packet decomposition, and the time-frequency matrix $A$ is expressed as follow:

$$A = \begin{bmatrix} C_{11} & C_{12} & \cdots & C_{1b} \\ C_{21} & C_{22} & \cdots & C_{2b} \\ \vdots & \vdots & \ddots & \vdots \\ C_{a1} & C_{a2} & \cdots & C_{ab} \end{bmatrix}$$

— S4.3.2

↓

$$A = U \Sigma V^T$$

where, $T$ is a matrix transpose operator, $U$ is a orthogonal matrix of a×a, and $V$ is a orthogonal matrix of b×b, and $\Sigma$ is the diagonal matrix of a×b; where $$\Sigma = \begin{bmatrix} \lambda_1 & 0 & \cdots & 0 \\ 0 & \lambda_2 & \cdots & 0 \\ \vdots & \vdots & \ddots & 0 \\ 0 & 0 & 0 & \lambda_r \end{bmatrix}$$

where, $\lambda$ is eigenvalues of a rank of the time-frequency matrix $A$, and the rank of the time-frequency matrix $A$ is denoted as $r = \text{rank}(A)$;

calculating the depth feature value $P_r$ of the Rayleigh wave in the laser ultrasonic signal;

where, $$P_r = \frac{\lambda_1 + \lambda_2 + \cdots + \lambda_r}{r}$$

computing the subsurface defect depth $d$, where $d = A_1 P_r$, and $A_1$ is a correction factor

SUBSURFACE DEFECT DETECTING DEVICE FOR CYLINDRICAL COMPONENTS AND METHOD THEREOF

CROSS REFERENCE TO RELATED APPLICATIONS

This application claims foreign priority of Chinese Patent Application No. 202410490871.X, filed on Apr. 23, 2024 in the China National Intellectual Property Administration, the disclosures of all of which are hereby incorporated by reference.

TECHNICAL FIELD

The present disclosure relates to the technical field of ultrasonic testing technology, in particular to a subsurface defect detecting device for cylindrical components and method thereof.

BACKGROUND

Cylindrical components, as the primary supporting and transmitting parts, are widely applied in various industrial sectors, such as engine crankshafts, rotating spindle heads, and roller bearings. However, during service, cylindrical components are prone to subsurface defect hidden beneath their surfaces due to the effects of cyclic loads, alternating stresses, and other factors. For instance, under high-cycle fatigue conditions, the initiation of fatigue cracks in roller bearings can transition from the surface to subsurface inclusions or voids, forming hidden subsurface defect. The presence of these subsurface defect negatively impacts the strength, performance, and lifespan of critical structures. If not detected in time, the stress concentration caused by subsurface defect can cause further crack propagation, eventually leading to surface spalling and component failure.

Currently, detection techniques for subsurface defect include X-ray inspection, infrared thermography, electromagnetic eddy current testing, Barkhausen noise detection, and ultrasonic testing. Among them, X-ray inspection has a limited scanning range and is only suitable for small components. Additionally, X-rays, as a radiation source, pose potential health hazards to operators. Furthermore, X-ray inspection equipment is typically expensive and has a relatively high operational cost. Infrared thermography has low accuracy for crack detection, and since subsurface defect in cylindrical components are often only a few millimeters deep, infrared thermography cannot accurately measure the depth of these defects. Eddy current testing is only suitable for metallic materials, and it faces difficulties in detecting defects with similar properties, especially at low depth resolutions, making it challenging to detect small defects. Barkhausen noise detection is mainly used for stress and phase transformation monitoring, with limited applications in defect detection. Traditional ultrasonic testing is not suitable for high-temperature or high-pressure environments, requires coupling media for proper application, and may experience signal distortion on rough surfaces. Moreover, traditional piezoelectric ultrasonic sensors cannot fully adhere to curved surfaces in cylindrical components.

Laser ultrasound is a non-contact, high-precision, and non-destructive testing technology. Compared to methods such as air-coupled ultrasound, laser ultrasound offers higher spatial and temporal resolution. Due to its characteristics of no contact, no coupling agents, multi-mode simultaneous excitation, and broad frequency bandwidth, laser ultrasound has a wide range of applications in material defect detection. Among the various waveforms in laser ultrasound, the Rayleigh waves generated by laser ultrasound can propagate along curved surfaces, and by analyzing the Rayleigh wave velocity, the defect location can be accurately calculated. Thus, laser ultrasound technology offers high precision for the localization of subsurface defect. Additionally, laser ultrasound provides excellent spatial flexibility; by adjusting the relative positions of the excitation laser and detection laser, non-destructive testing of complex structural components can be achieved. However, the geometric dispersion caused by the curved surface of cylindrical components results in continuous changes in the Rayleigh wave waveform during propagation along the surface, which leads to reduced depth and location accuracy when calculating the defect's reflection wave arrival time. Furthermore, the width of subsurface defect is an important dimension for evaluating the extent of defect propagation, which provides valuable guidance for subsequent repair and maintenance. However, existing technologies do not report methods for detecting the width of subsurface defect.

Due to the geometric dispersion caused by the curved surface of cylindrical components, waveform of the Rayleigh wave changes during propagation along the surface, leading to reduced accuracy in depth and location estimation based on the arrival time of the defect's reflection wave. However, by optimizing the relative angle between the detection laser and the excitation laser, the collected Rayleigh wave can exhibit a single polarity. This adjustment reduces the influence of various conversion waves at the subsurface defect location and effectively improves the detection accuracy.

SUMMARY

The present disclosure provides a subsurface defect detecting device for cylindrical components and method thereof, to address the aforementioned issues.

To realize the above objective, the present disclosure provides a subsurface defect detecting device, including: an electric rotating platform, a three-jaw chuck, a first linear supporting base, and a second linear supporting base; wherein the three-jaw chuck being mounted on the electric rotating platform, and the three-jaw chuck is configured to fix a workpiece to be detected; and the first linear supporting base and the second linear supporting base being arranged close to the electric rotating platform, and the first linear supporting base and the second linear supporting base are in contact with each other and are perpendicular to each other; and a first electric telescopic rod being installed on a slider of the first linear supporting base, and a second electric telescopic rod being fixed at an upper end of the first electric telescopic rod; and the second electric telescopic rod is perpendicular to the first linear supporting base and parallel to the second linear supporting base; and a pulse laser focusing probe being fixed at a movable end of the second electric telescopic rod; and a rotating base being mounted on a slider of the second linear supporting base, and a third electric telescopic rod is rotatably mounted on the rotating base; and a fourth electric telescopic rod being fixed at an upper end of the third electric telescopic rod, and a continuous laser focusing probe being fixed at a movable end of the fourth electric telescopic rod; and the electric rotating platform, the first linear supporting base, the second linear supporting base, the first electric telescopic rod, the second electric telescopic rod, the third electric telescopic rod, and the fourth electric telescopic rod being communicated with a personal computer (PC) terminal; and the PC terminal being communicated with a control terminal of the pulse laser and an output terminal of a dual-wave mixing interferometer; and the pulse laser is connected to the pulse laser focusing probe to emit pulse laser, and the dual-wave mixing interferometer is connected to the continuous laser focusing probe to convert laser ultrasonic signals received by the continuous laser focusing probe into electrical signals and transmit them to the PC terminal.

Furthermore, the rotating base is fixedly mounted with a rotating motor, and a worm gear is fixedly connected to an output shaft of the rotating motor; and a endless screw is meshed with a worm gear, and the worm gear is fixedly connected to a cylinder body of third electric telescopic rod.

The Present Disclosure Further Provides a Subsurface Defect Detecting Method for Cylindrical Components, as Shown in FIG. 11, Including:

S1, installing the workpiece to be detected, and establishing a plane rectangular coordinate system (x-y) with an intersection of the first linear supporting base and the second linear supporting base as a coordinate origin, and the first linear supporting base is located on the y-axis, and the second linear supporting base is located on the x-axis; and setting coordinates of the first electric telescopic rod in the x-y plane rectangular coordinate system to (0, y), and setting coordinates of the third electric telescopic rod in the x-y plane rectangular coordinate system to (x, 0), and setting coordinates of the workpiece to be detected in the x-y plane rectangular coordinate system to ($x_0$, $y_0$); and S2, adjusting a position of the pulse laser focusing probe, and adjusting a position and an angle of the continuous laser focusing probe to ensure that the laser ultrasonic signal received by the continuous laser focusing probe is optimal; and S3, performing a layer-by-layer scanning of the workpiece to be detected through a cooperation of the electric rotating platform, the first electric telescopic rod, and the third electric telescopic rod, while synchronously recording rotational angles and measurement heights of the workpiece to be detected and corresponding laser ultrasonic signals; and S4, analyzing collected laser ultrasonic signals by the PC terminal; and determining whether the workpiece to be detected has the subsurface defect by observing variations in positive peak values of the Rayleigh wave in the collected laser ultrasonic signals; and calibrating a location of the subsurface defect based on the workpiece rotation angles and the measurement heights; and calibrating a subsurface defect depth d by calculating a depth feature value $p_r$ of the Rayleigh wave in the laser ultrasonic signals; and extracting positive peak value $R_{pos}$ and negative peak value $K_{neg}$ of the Rayleigh wave in the laser ultrasonic signals, and calculating a subsurface defect width w; and S5, outputting subsurface defect information of the workpiece to be detected, and the subsurface defect information includes whether the subsurface defect is present, the location of the subsurface defect on the workpiece to be detected, the subsurface defect depth, and the subsurface defect width.

Furthermore, as shown in FIG. 12, S2 includes the following steps:

S2.1, adjusting an extension length of the first electric telescopic rod and the third electric telescopic rod so that the pulsed laser focusing probe and the continuous laser focusing probe are at a same horizontal height as an upper surface of the workpiece to be detected; that is, $h_0+l_1=h$; where, $h_0$ is a height of the upper surface of the three-jaw chuck, $l_1$ is a distance between the upper surface of the workpiece to be detected and the upper surface of the three-jaw chuck, and h is a height of the pulsed laser focusing probe and continuous laser focusing probe; and S2.2, adjusting the extension length of the first electric telescopic rod and the third electric telescopic rod, to lower the pulsed laser focusing probe and continuous laser focusing probe by 2 mm; and S2.3, adjusting a position of the first electric telescopic rod through the first linear supporting base, and moving the first electric telescopic rod to a coordinate point (0, $y_0$), making the pulsed laser focusing probe aligned with the workpiece to be detected;

S2.4, adjusting the extension length of the second electric telescopic rod, allowing the pulsed laser focusing probe emits a pulsed laser and forms a line spot on the surface of the workpiece to be detected with a size of 4 mm×0.5 mm; and the line spot is parallel to an axis of the workpiece to be detected; and S2.5, adjusting a position and an angle of the continuous laser focusing probe.

Furthermore, as shown in FIG. 13, S2.5 includes the following steps:

S2.5.1, moving the third electric telescopic rod to the coordinate origin through the second linear supporting base; and S2.5.2, adjusting an angle of fourth electric telescopic rod using the rotating motor, to allow the continuous laser focusing probe faces the coordinate point ($x_0$, $y_0$) of the workpiece to be detected; and the coordinate points ($x_0$, $y_0$), (x, 0), and ($x_0$, 0) form a right triangle, where the coordinate point (x, 0) is the coordinate of the third electric telescopic rod; making the continuous laser focusing probe is aligned with the axis of the workpiece to be detected, an angle between fourth electric telescopic rod and the second linear supporting base satisfies the following formal:

$$\varphi = \arctan\left(\frac{x_0 - x}{y_0}\right);$$

and

S2.5.3, adjusting an extension length of the second linear supporting base to allow the continuous laser focusing probe emits a continuous laser and forms a circular light spot with a diameter of 2 mm on the surface of the workpiece to be detected; and S2.5.4, controlling the pulse laser to emit a pulsed laser via the pulsed laser focusing probe, and exciting laser ultrasound on the surface of the workpiece to be detected; collecting the laser ultrasound signal through the continuous laser focusing probe, and laser ultrasound signal is then converted into an electrical signal by the dual-wave mixing interferometer and transmitted to the PC terminal; and the PC terminal is configured to store the laser ultrasound signal and to record the corresponding coordinate of third electric telescopic rod; and S2.5.5, stepping the third electric telescopic rod along a positive x-axis through the second linear supporting base, repeating S2.5.2 to S2.5.5 until $(m+1)\cdot\Delta x > x_{max}$, where $x_{max}$ is a length of the second linear supporting base, and m is a number of steps of the third electric telescopic rod along the x-axis; and S2.5.6, analyzing the collected laser ultrasound signals by the PC terminal, extracting the positive peak value $R_{pos}$ and the negative peak value $R_{neg}$ of the Rayleigh wave in the laser ultrasound signals; when the maximum value of $R_{pos}/R_{neg}$ is taken, the coordinate point of the third electric telescopic rod at $(x_1, 0)$ is marked as an optimal detection position; moving the third electric telescopic rod to the coordinate point $(x_1, 0)$ by the second linear supporting base, then repeat S2.5.2 and S2.5.3 to adjust the position and the angle of the continuous laser focusing probe.

Furthermore, as shown in FIG. 14, S3 includes the following steps:

S3.1, driving the workpiece to be detected to rotate in steps by the electric rotating platform, with each step involving a specific rotation angle of $\Delta\theta=2°$; after each step, the pulse laser is controlled to emit a pulse laser through the pulse laser focusing probe; and collecting the laser ultrasound signals from current position by the continuous laser focusing probe; and converting the laser ultrasound signals into electrical signals by the dual-wave mixing interferometer and the electrical signals are transmitted to the PC terminal; and the PC terminal is configured to store the laser ultrasound signals and records the corresponding rotation angles and measurement heights of the workpiece to be detected, until $n \cdot \Delta\theta = 360°$, where n represents the number of rotation steps of the electric rotary platform; and S3.2, synchronously shorting the first electric telescopic rod and the third electric telescopic rod in steps, with each step having a specific shortening distance of $\Delta h=5$ mm; performing a judgment according the following inequality: $h > h_0$; if the inequality holds, the subsurface defect detection of the workpiece to be detected is not completed, and performing S3.1 and S3.2 repeatedly; if the inequality does not hold, the subsurface defect detection of the workpiece to be detected is considered complete.

Furthermore, as shown in FIG. 15, S4 includes the following steps:

S4.1, calibrating a time-domain and a frequency-domain of the laser ultrasonic signals for the workpiece to be detected in a defect-free state;

S4.2, comparing the peak values of the laser ultrasonic signals collected in S3 with the calibrated laser ultrasonic signals from S41; and marking the rotational angles $\alpha_1$, $\alpha_2$, $\alpha_3$ and $\alpha_4$, where a represents a rotational angle at which the subsurface defect starts to enter the detection area, $\alpha_2$ represents a rotational angle at which the subsurface defect completely enters the detection area, $\alpha_3$ represents a rotational angle at which the subsurface defect begins to shift out the detection area, and $\alpha_4$ represents a rotational angle at which the subsurface defect completely shifts out the detection area; and $\alpha_1$ corresponds to a maximum positive peak value of the Rayleigh wave peak curve, $\alpha_2$ and $\alpha_3$ correspond to two negative peak values in a Rayleigh wave peak curve, and $\alpha_4$ corresponds to the Rayleigh wave positive peak value which increases from a minimum value to a positive value of the Rayleigh wave positive value of the defect-free state calibrated in S41; and the detection area is a sector-shaped region between the pulse laser focusing probe and the continuous laser focusing probe; and a circumferential position of the subsurface defect is calibrated based on the rotational angles and the measurement heights of the workpiece to be detected; and S4.3, if it is determined by comparing the peak values of S41 that the subsurface defect is present at the corresponding position of the laser ultrasonic signal, the subsurface defect depth d is calibrated by calculating the depth feature value $p_r$ of the Rayleigh wave in the laser ultrasonic signal through the PC terminal;

S4.4, averaging the laser ultrasonic signals within the angular range from $\alpha_2$ to $\alpha_3$ through the PC terminal, and extracting positive peak value $R_{pos}$ and negative peak value $R_{neg}$ of the Rayleigh wave in the laser ultrasonic signals, and calculating a subsurface defect width w using a width feature value $|R_{neg}/R_{pos}|$ and the subsurface defect width w is calculated according to the following formula:

$$w = \frac{2\pi}{d}\arctan\left(\left|\frac{R_{neg}}{R_{pos}}\right|\right).$$

Specifically, as shown in FIG. 16, S4.3 includes the following steps:

S4.3.1, performing a wavelet packet decomposition to the laser ultrasonic signal, and the laser ultrasonic signal $\varphi(t)$ is expressed as:

$C_{i,k}{}^j = \int \varphi(t) \cdot W_{i,k}(t) dt;$ $W_{i,k}(t) = 2^{-i/2} W(2^{-i} t - k);$ where, t is a time series, i is a frequency band order, j is a wavelet decomposition level, k is a wavelet packet decomposition parameter, and C is a wavelet packet function, and $W_{i,k}(t)$ is a wavelet packet decomposition coefficient;

S4.3.2, constructing a time-frequency matrix A of the laser ultrasonic signal that contains information about subsurface defect through the wavelet packet decomposition, and the time-frequency matrix A is expressed as follow:

$$A = \begin{bmatrix} C_{11} & C_{12} & \cdots & C_{1b} \\ C_{21} & C_{22} & \cdots & C_{2b} \\ \vdots & \vdots & \ddots & \vdots \\ C_{a1} & C_{a2} & \cdots & C_{ab} \end{bmatrix};$$

where, $a=N/2^j$, $b=2^j$, N is a number of sampling points of the laser ultrasonic signal $\varphi(t)$;

S4.3.3, $A = U\Sigma V^T$;

where, T is a matrix transpose operator, U is a orthogonal matrix of a×a, and V is a orthogonal matrix of b×b, and Σ is the diagonal matrix of a×b;

where, $$\sum = \begin{bmatrix} \lambda_1 & 0 & \cdots & 0 \\ 0 & \lambda_2 & \cdots & 0 \\ \vdots & \vdots & \ddots & 0 \\ 0 & 0 & 0 & \lambda_r \end{bmatrix};$$

where, $\lambda$ is eigenvalues of a rank of the time-frequency matrix A, and the rank of the time-frequency matrix A is denoted as r=rank(A);

calculating the depth feature value $p_r$ of the Rayleigh wave in the laser ultrasonic signal;

where, $$p_r = \frac{\lambda_1 + \lambda_2 + \cdots + \lambda_r}{r};$$

computing the subsurface defect depth d, where $d = A_1 \cdot p_r$, and $A_1$ is a correction factor.

Compared to existing technologies, the present disclosure has the some advantages.

This disclosure addresses the non-destructive testing of subsurface defect in cylindrical components by considering the impact of the non-flat surface on laser ultrasound Rayleigh waves. By incorporating a movable device, to optimize the laser ultrasound detection angle, thus determining the optimal detection angle for cylindrical components with different radii of curvature. This reduces the influence of non-flat surfaces on the testing results.

This disclosure adopts laser ultrasound technology to achieve comprehensive, non-contact detection of cylindrical components. Taking into account the rotational characteristics of cylindrical components, it uses a method of rotating the workpiece under test to realize 360° detection, which is fast, accurate, and highly automated.

This disclosure extracts the positive and negative peak values of the Rayleigh wave in the laser ultrasound signal to form the width feature value. By utilizing this width feature value, it calculates the width of subsurface defect. This not only enables the measurement of subsurface defect widths but also reduces the impact of changes in excitation laser power on the detection accuracy.

BRIEF DESCRIPTION OF THE DRAWINGS

FIG. 11 is a step flowchart of a subsurface defect detecting method for cylindrical components according to an embodiment of the present disclosure.

FIG. 14 is a detailed step flowchart of S3 in FIG. 11.
FIG. 16 is a detailed step flowchart of S4.3 in FIG. 15.

Figure 1:
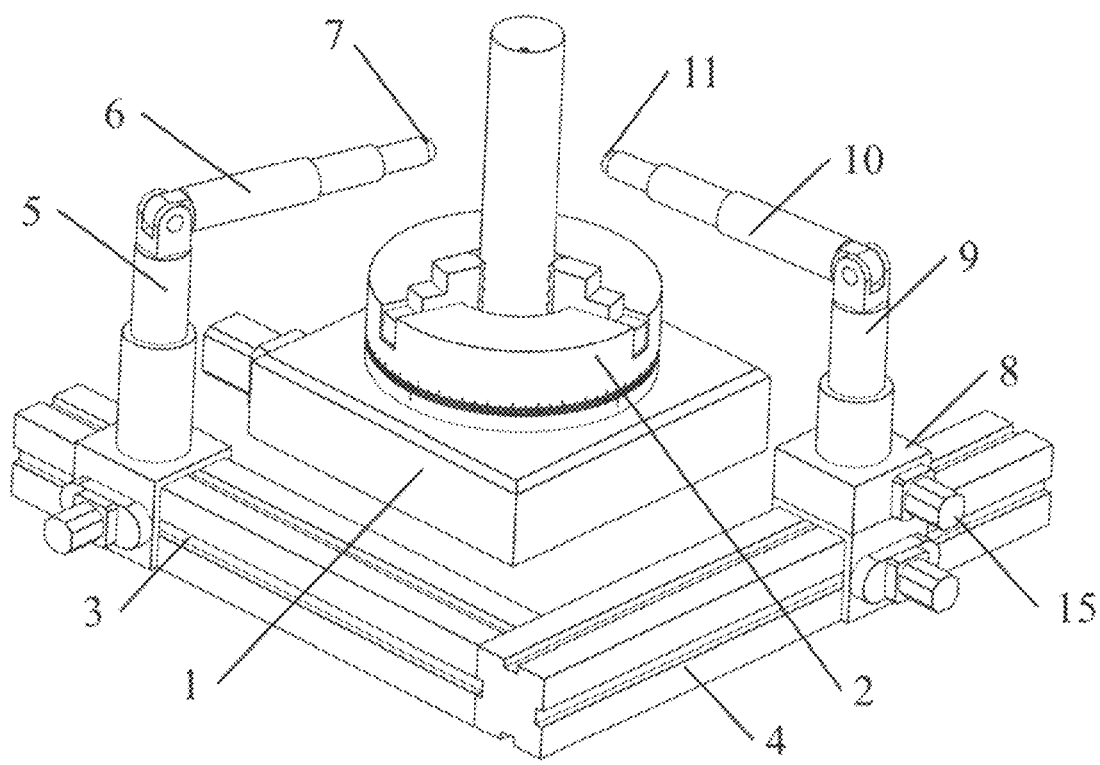
FIG. 1 is a schematic structural diagram of a subsurface defect detecting device for cylindrical components according to an embodiment of the present disclosure.

DESCRIPTION OF THE REFERENCE NUMERAL 1 electric rotating platform, 2 three-jaw chuck, 3 first linear supporting base, 4 second linear supporting base, 5 first electric telescopic rod, 6 second electric telescopic rod, 7 pulse laser focusing probe, 8 rotating base, 9 third electric telescopic rod, 10 fourth electric telescopic rod, 11 continuous laser focusing probe, 12 PC terminal, 13 pulse laser, 14 dual-wave mixing interferometer, 15 rotating motor, 16 endless screw, 17 worm gear.

Detailed Description of the Embodiments

The technical solutions in the embodiments of the present disclosure will be described clearly and completely with reference to the accompanying drawings in the embodiments of the present disclosure. Obviously, the described embodiments are only a part of the embodiments of the present disclosure rather than all of them. Based on the embodiments in the present disclosure, all other embodiments obtained by those skilled in the art without creative work shall fall within the scope of protection of the present disclosure.

Figure 2:
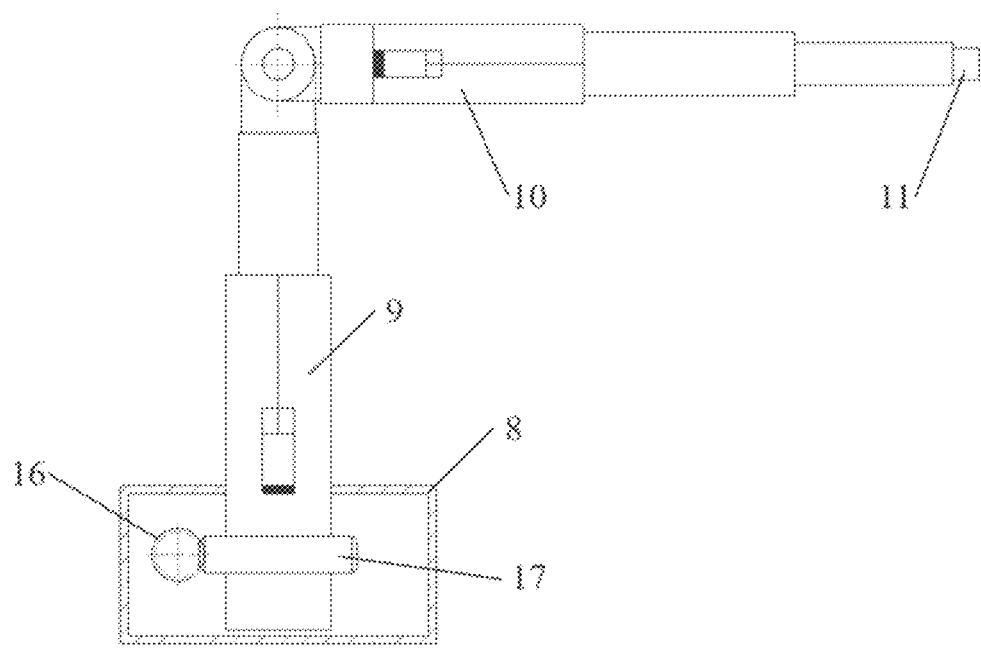
FIG. 2 is a schematic structural diagram of a transmission of a third electric telescopic rod according to an embodiment of the present disclosure.
Figure 3:
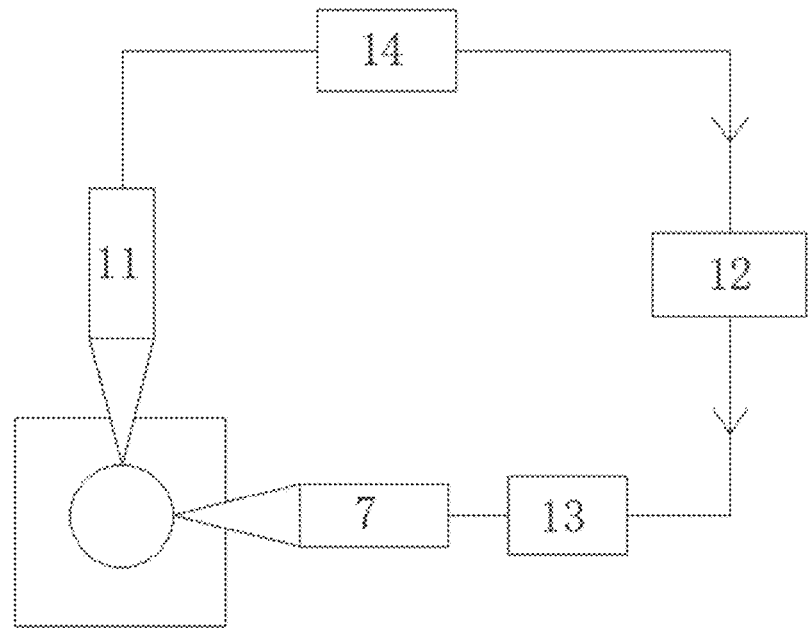
FIG. 3 is a supporting base schematic diagram of laser detection.
Figure 4:
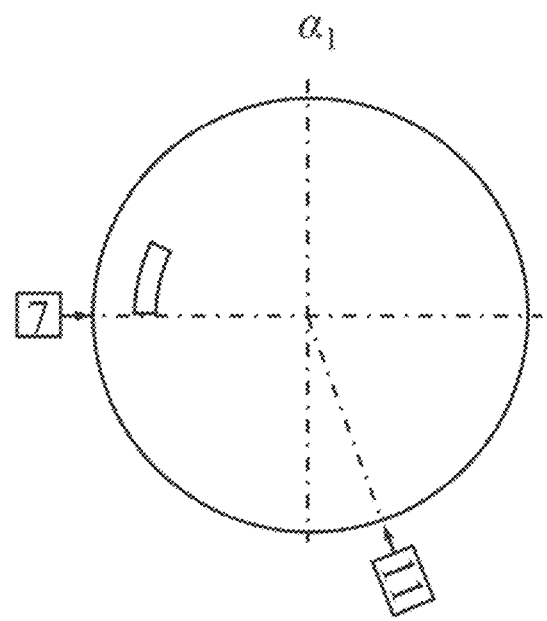
FIG. 4 is a schematic structural diagram of the subsurface defect starting to enter the detection area.
Figure 5:
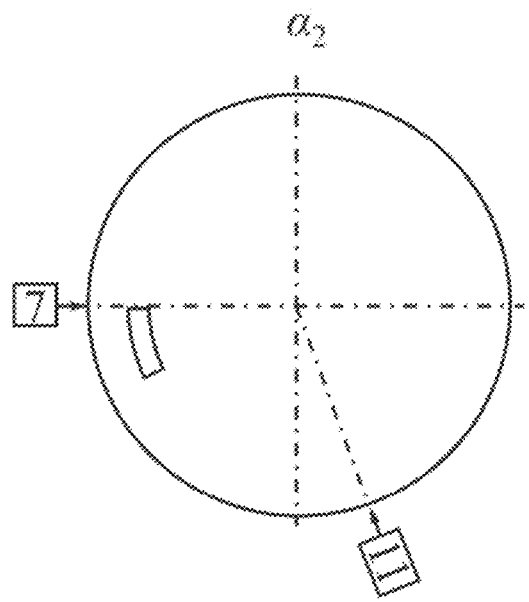
FIG. 5 is a schematic structural diagram of the subsurface defect fully entering the detection area.
Figure 6:
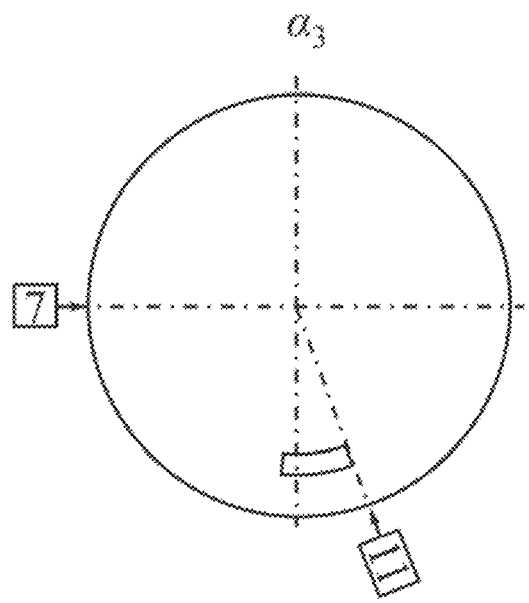
FIG. 6 is a schematic structural diagram of the subsurface defect starting to shift out of the detection area.
Figure 7:
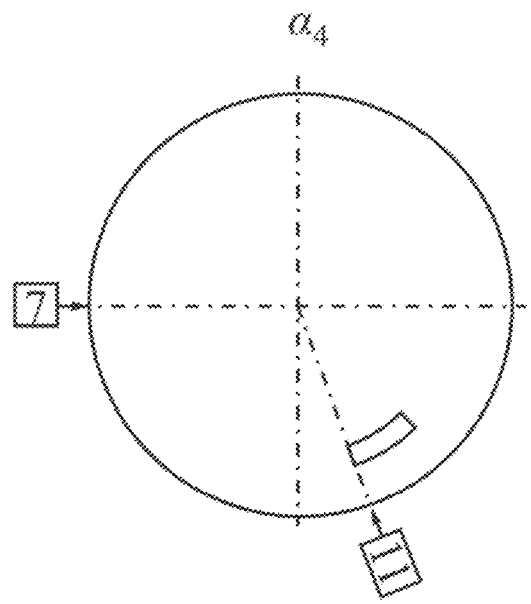
FIG. 7 is a schematic structural diagram of the subsurface defect fully shifting out the detection area.
Figure 8:
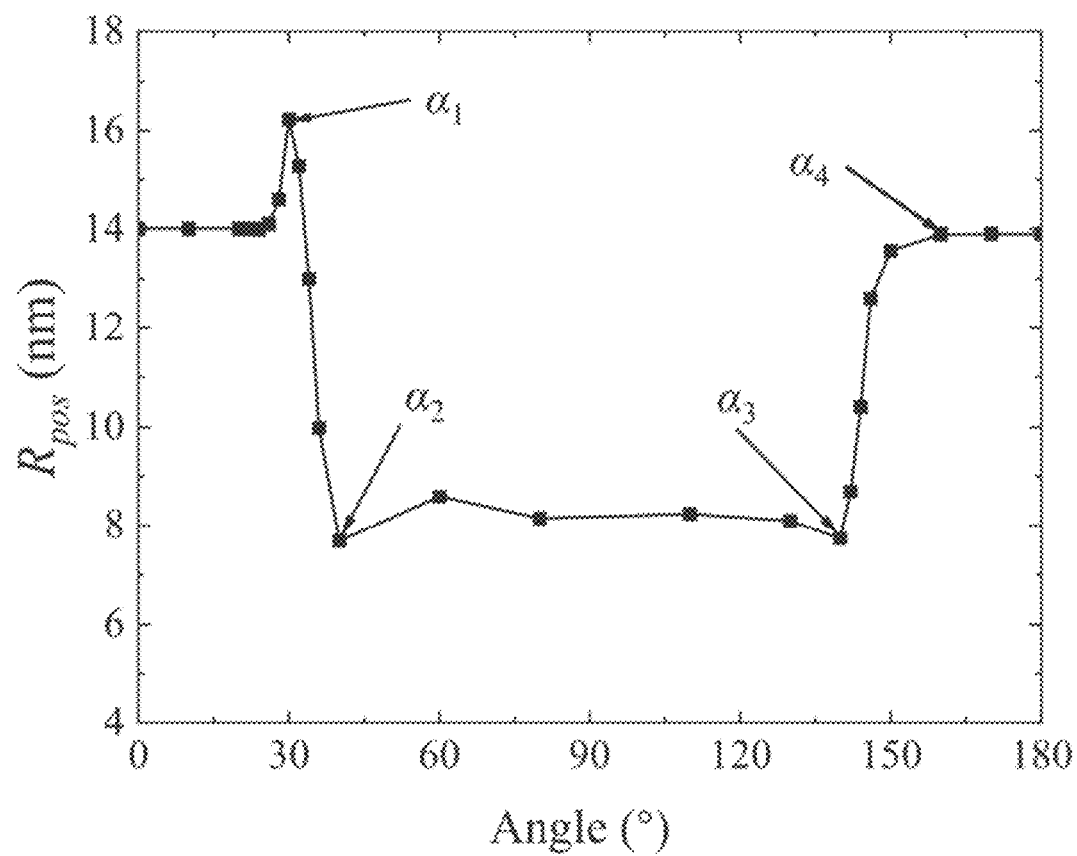
FIG. 8 is a line graph of Rayleigh waves and angles.
Figure 9:
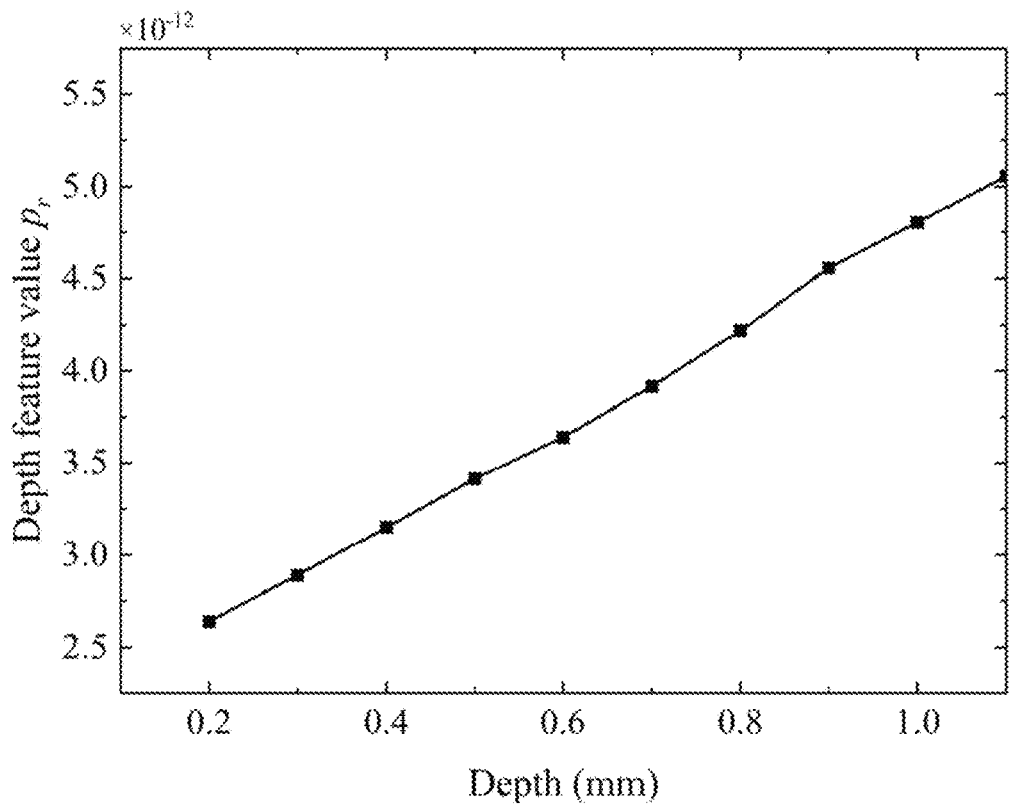
FIG. 9 is a schematic diagram of changes in depth characteristic parameters of the subsurface defect.
Figure 10:
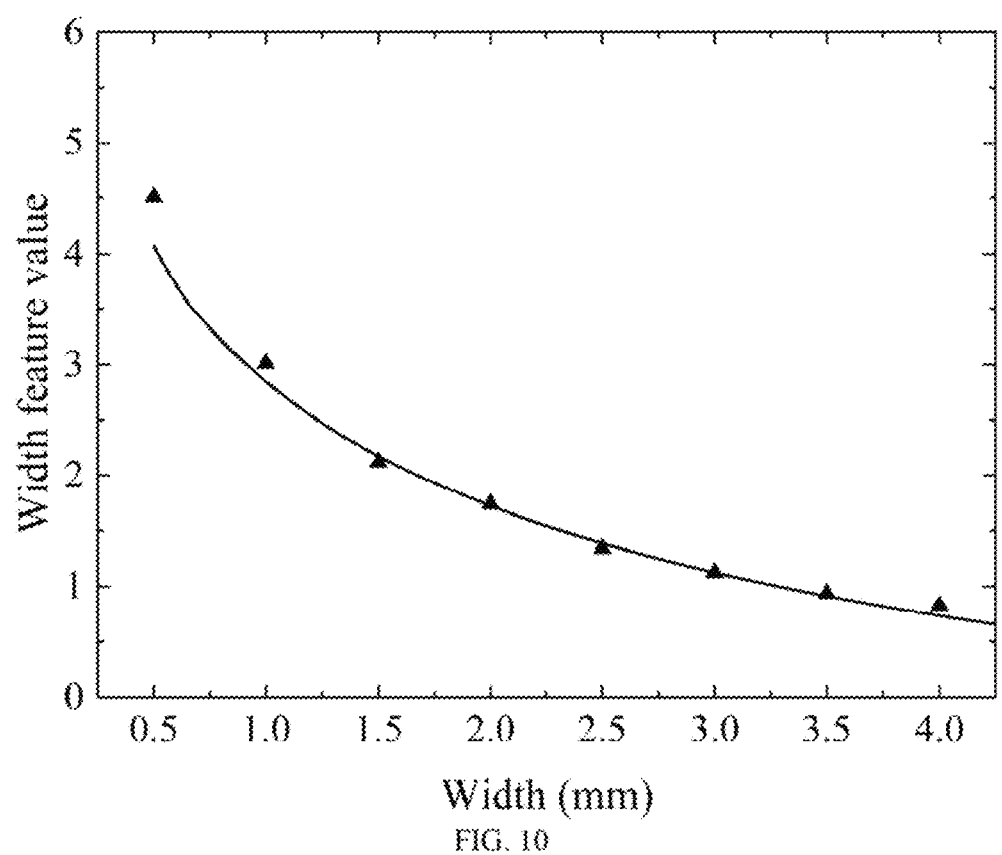
FIG. 10 is a schematic diagram of changes in width characteristic parameters of the subsurface defect.
Figure 12:
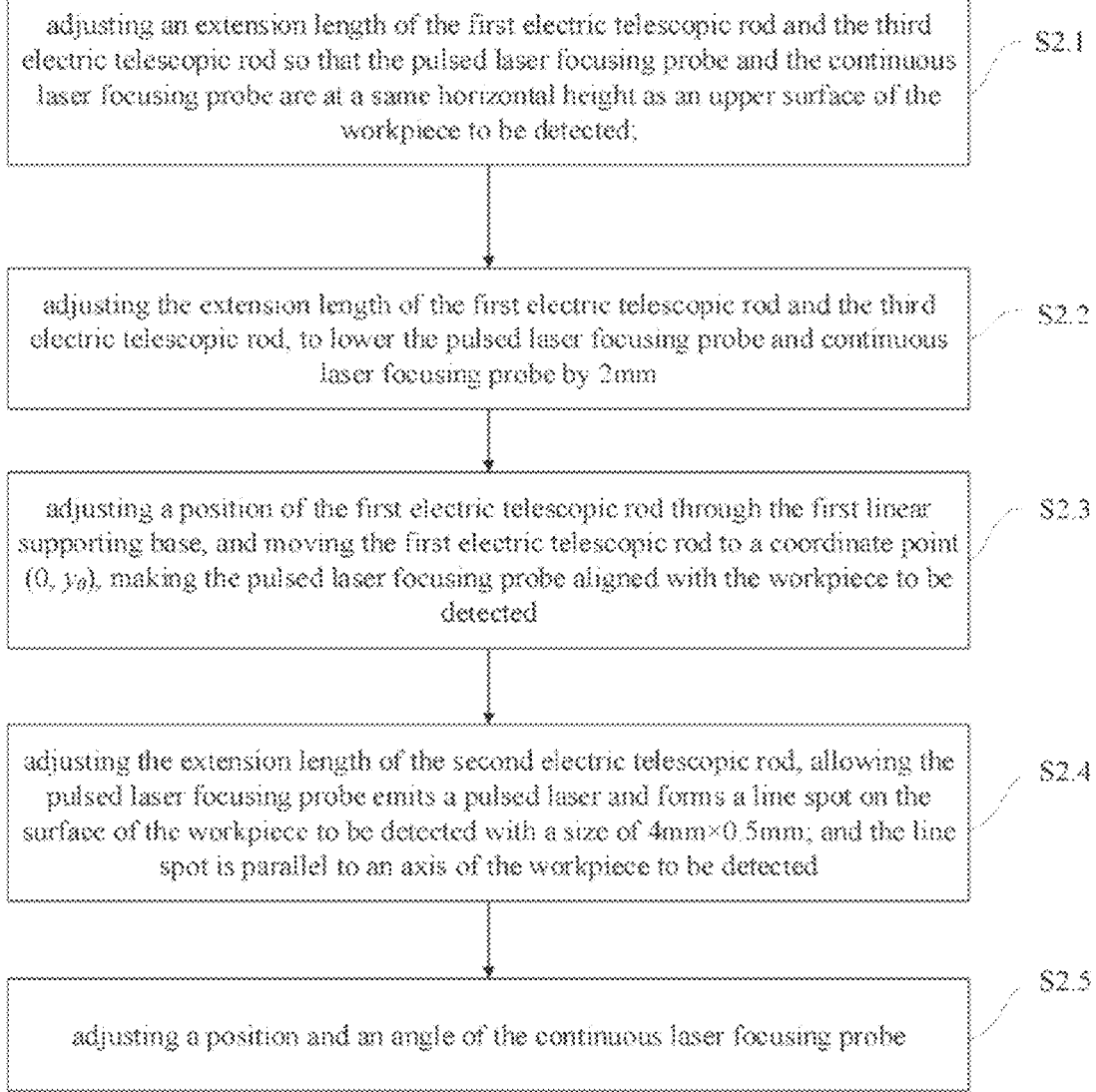
FIG. 12 is a detailed step flowchart of S2 in FIG. 11.
Figure 13:
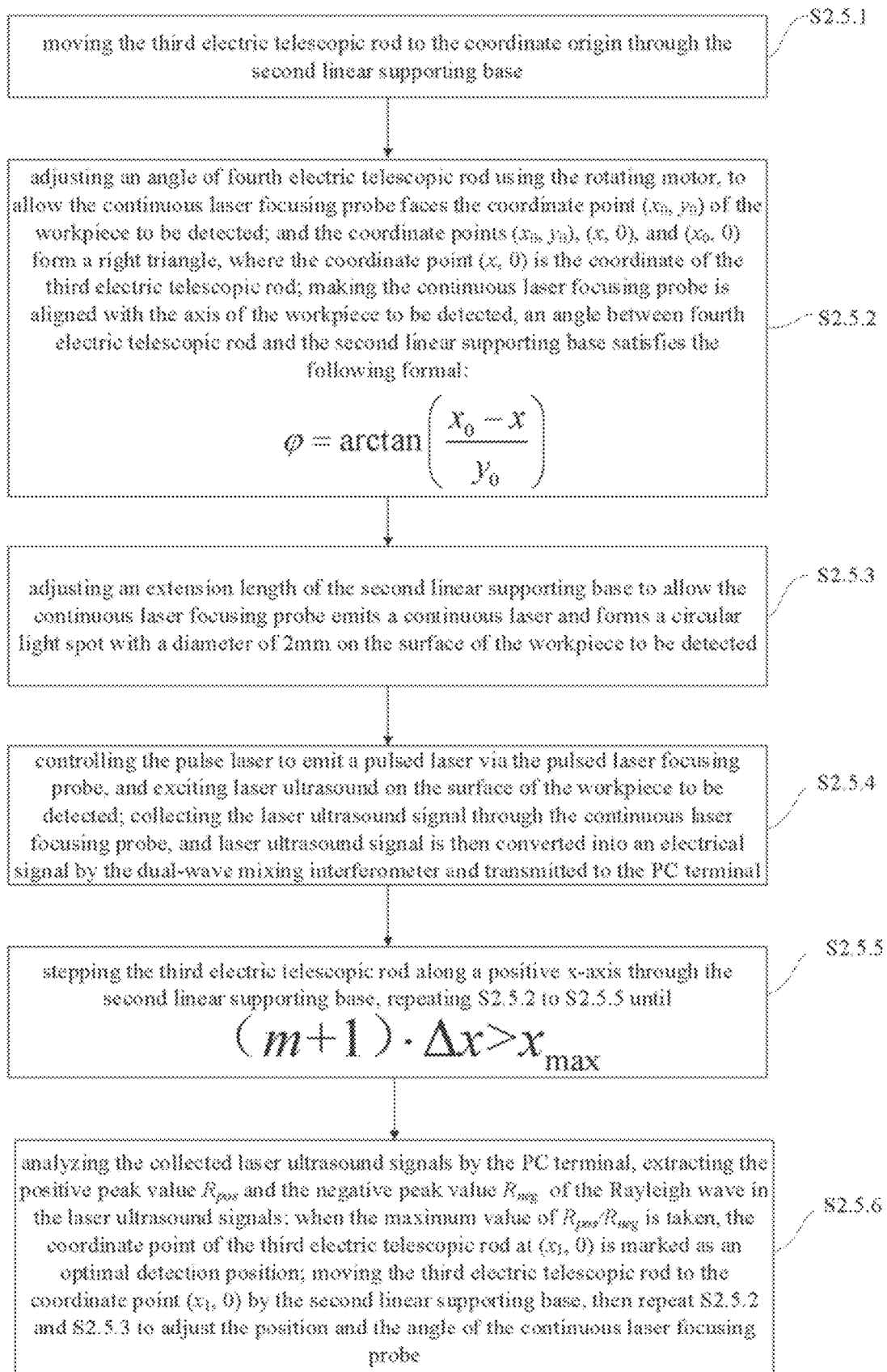
FIG. 13 is a detailed step flowchart of S2.5 in FIG. 12.
Figure 15:
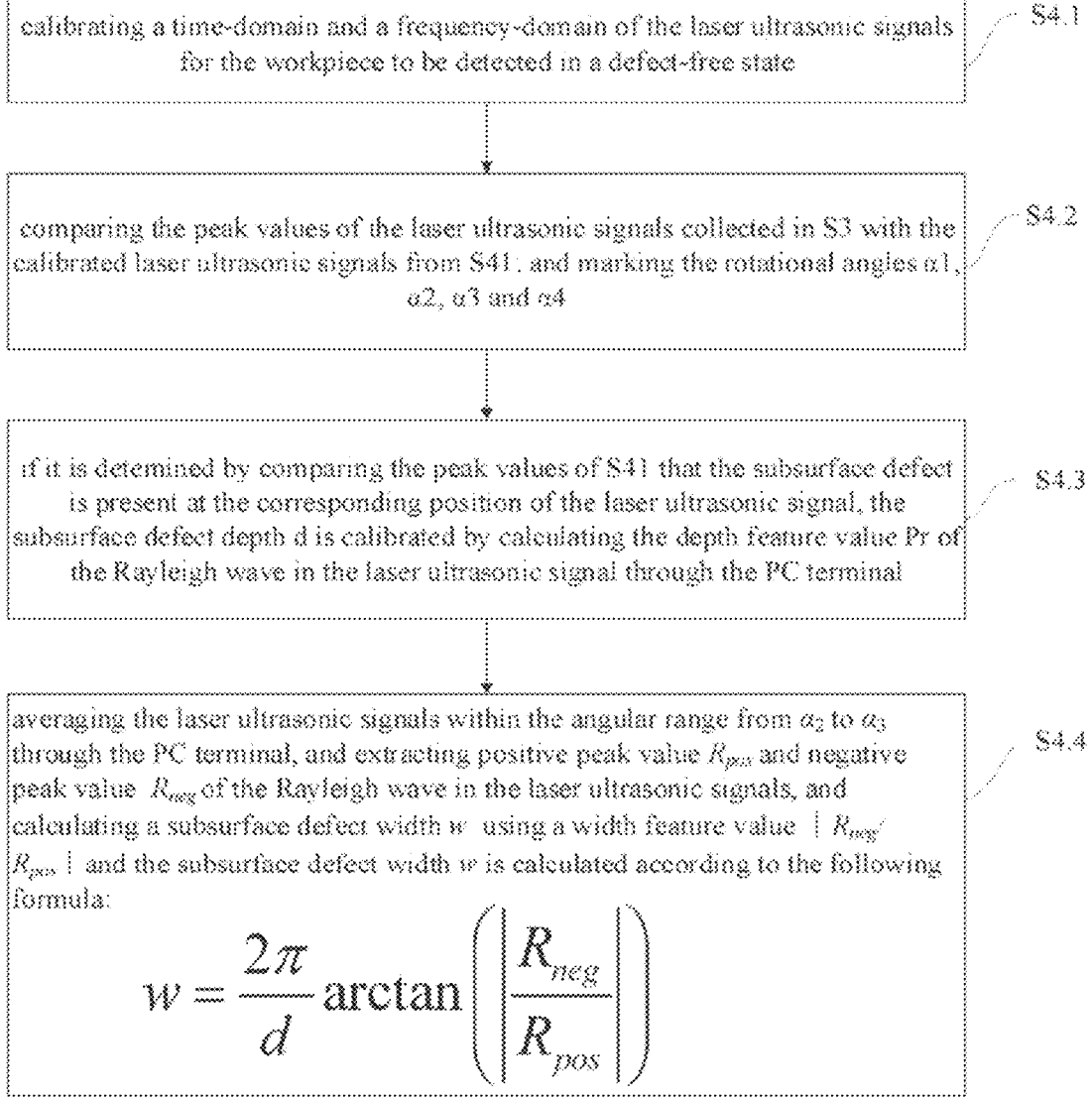
FIG. 15 is a detailed step flowchart of S4 in FIG. 11.

The present disclosure provides a subsurface defect detecting device for cylindrical components. Referring to FIG. 1 to FIG. 10, the subsurface defect detecting device for cylindrical components includes: an electric rotating platform 1, a three-jaw chuck 2, a first linear supporting base 3, and a second linear supporting base 4. The three-jaw chuck 2 is mounted on the electric rotating platform 1, and the three-jaw chuck 2 is configured to fix a workpiece to be detected. The first linear supporting base 3 and the second linear supporting base 4 are arranged close to the electric rotating platform 1, and the first linear supporting base 3 and the second linear supporting base 4 are in contact with each other and are perpendicular to each other. A first electric telescopic rod 5 is installed on a slider of the first linear supporting base 3, and a second electric telescopic rod 6 is fixed at an upper end of the first electric telescopic rod 5; and the second electric telescopic rod 6 is perpendicular to the first linear supporting base 3 and parallel to the second linear supporting base 4. A pulse laser focusing probe 7 is fixed at a movable end of the second electric telescopic rod 6. A rotating base 8 is mounted on a slider of the second linear supporting base 4, and a third electric telescopic rod 9 is rotatably mounted on the rotating base 8. A rotating motor 15 is fixedly installed on the rotating base 8, and a endless screw 16 is fixedly connected to the output shaft of the rotating motor 15. The endless screw 16 meshes with a worm wheel 17, which is fixedly connected to the cylinder body of the third electric telescopic rod 9. A fourth electric telescopic rod 10 is fixedly provided at the upper end of the third electric telescopic rod 9. A fourth electric telescopic rod 10 being fixed at an upper end of the third electric telescopic rod 9, and a continuous laser focusing probe 11 being fixed at a movable end of the fourth electric telescopic rod 10. The electric rotating platform 1, the first linear supporting base 3, the second linear supporting base 4, the first electric telescopic rod 5, the second electric telescopic rod 6, the third electric telescopic rod 9, and the fourth electric telescopic rod 10 being communicated with a personal computer (PC) terminal 12. The PC terminal 12 being communicated with a control terminal of the pulse laser 13 and an output terminal of a dual-wave mixing interferometer 14. The pulse laser 13 is connected to the pulse laser focusing probe 7 to emit pulse laser, and the dual-wave mixing interferometer 14 is connected to the continuous laser focusing probe 11 to convert laser ultrasonic signals received by the continuous laser focusing probe 11 into electrical signals and transmit them to the PC terminal 12.

The present disclosure further provides a subsurface defect detecting method for cylindrical components, including the following steps.

S1, installing the workpiece to be detected, and establishing a plane rectangular coordinate system (x-y) with an intersection of the first linear supporting base 3 and the second linear supporting base 4 as a coordinate origin. The first linear supporting base 3 is located on the y-axis, and the second linear supporting base 4 is located on the x-axis. Setting coordinates of the first electric telescopic rod 5 in the x-y plane rectangular coordinate system to (0, y), and setting coordinates of the third electric telescopic rod 9 in the x-y plane rectangular coordinate system to (x, 0), and setting coordinates of the workpiece to be detected in the x-y plane rectangular coordinate system to $(x_0, y_0)$.

S2, adjusting a position of the pulse laser focusing probe 7, and adjusting a position and an angle of the continuous laser focusing probe 11 to ensure that the laser ultrasonic signal received by the continuous laser focusing probe 11 is optimal.

S2 includes the following steps:

S2.1, adjusting an extension length of the first electric telescopic rod 5 and the third electric telescopic rod 9 so that the pulsed laser focusing probe 7 and the continuous laser focusing probe 11 are at a same horizontal height as an upper surface of the workpiece to be detected; that is, $h_0 + l_1 = h;$ where, $h_0$ is a height of the upper surface of the three-jaw chuck, $l_1$ is a distance between the upper surface of the workpiece to be detected and the upper surface of the three-jaw chuck, and h is a height of the pulsed laser focusing probe and continuous laser focusing probe.

S2.2, adjusting the extension length of the first electric telescopic rod 5 and the third electric telescopic rod 9, to lower the pulsed laser focusing probe 7 and continuous laser focusing probe 11 by 2 mm.

S2.3, adjusting a position of the first electric telescopic rod through the first linear supporting base 3, and moving the first electric telescopic rod 5 to a coordinate point $(0, y_0)$, making the pulsed laser focusing probe 7 aligned with the workpiece to be detected.

S2.4, adjusting the extension length of the second electric telescopic rod 6, allowing the pulsed laser focusing probe 7 emits a pulsed laser and forms a line spot on the surface of the workpiece to be detected with a size of 4 mm×0.5 mm. Further, the line spot is parallel to an axis of the workpiece to be detected.

S2.5, adjusting a position and an angle of the continuous laser focusing probe 11.

S2.5 includes the following steps:

S2.5.1, moving the third electric telescopic rod 9 to the coordinate origin through the second linear supporting base 4.

S2.5.2, adjusting an angle of fourth electric telescopic rod 10 using the rotating motor 15, to allow the continuous laser focusing probe 11 faces the coordinate point $(x_0, y_0)$ of the workpiece to be detected; and the coordinate points $(x_0, y_0)$, (x, 0), and $(x_0, 0)$ form a right triangle, where the coordinate point (x, 0) is the coordinate of the third electric telescopic rod 9. Making the continuous laser focusing probe 11 is aligned with the axis of the workpiece to be detected, an angle between fourth electric telescopic rod 10 and the second linear supporting base 4 satisfies the following formal:

$$\varphi = \arctan\left(\frac{x_0 - x}{y_0}\right).$$

S2.5.3, adjusting an extension length of the second linear supporting base 10 to allow the continuous laser focusing probe 11 emits a continuous laser and forms a circular light spot with a diameter of 2 mm on the surface of the workpiece to be detected.

S2.5.4, controlling the pulse laser 13 to emit a pulsed laser via the pulsed laser focusing probe 7, and exciting laser ultrasound on the surface of the workpiece to be detected. Collecting the laser ultrasound signal through the continuous laser focusing probe 11, and laser ultrasound signal is then converted into an electrical signal by the dual-wave mixing interferometer 14 and transmitted to the PC terminal 12. The PC terminal 12 in configured to store the laser ultrasound signal and to record the corresponding coordinate of third electric telescopic rod 9.

S2.5.5, stepping the third electric telescopic rod 9 along a positive x-axis through the second linear supporting base 4, repeating S2.5.2 to S2.5.5 until $(m+1)\cdot\Delta x > x_{max}$, where $x_{max}$ is a length of the second linear supporting base 4, and m is a number of steps of the third electric telescopic rod 9 along the x-axis.

S2.5.6, analyzing the collected laser ultrasound signals by the PC terminal, extracting the positive peak value $R_{pos}$ and the negative peak value $R_{neg}$ of the Rayleigh wave in the laser ultrasound signals. When the maximum value of $R_{pos}/R_{neg}$, is taken, the coordinate point of the third electric telescopic rod 9 at $(x_1, 0)$ is marked as an optimal detection position. And then, moving the third electric telescopic rod 9 to the coordinate point $(x_1, 0)$ by the second linear supporting base 4, then repeat S2.5.2 and S2.5.3 to adjust the position and the angle of the continuous laser focusing probe 11.

S3, performing a layer-by-layer scanning of the workpiece to be detected through a cooperation of the electric rotating platform 1, the first electric telescopic rod 5, and the third electric telescopic rod 9, while synchronously recording rotational angles and measurement heights of the workpiece to be detected and corresponding laser ultrasonic signals. Specifically, S3 includes the following steps.

S3.1, driving the workpiece to be detected to rotate in steps by the electric rotating platform 1, with each step involving a specific rotation angle of $\Delta\theta = 2°$. After each step, the pulse laser 13 is controlled to emit a pulse laser through the pulse laser focusing probe 7. Collecting the laser ultrasound signals from current position by the continuous laser focusing probe 11. And then converting the laser ultrasound signals into electrical signals by the dual-wave mixing interferometer 14 and the electrical signals are transmitted to the PC terminal 12. The PC terminal 12 is configured to store the laser ultrasound signals and records the corresponding rotation angles and measurement heights of the workpiece to be detected, until $n\cdot\Delta\theta = 360°$, where n represents the number of rotation steps of the electric rotary platform 1.

S3.2, synchronously shorting the first electric telescopic rod 5 and the third electric telescopic rod 9 in steps, with each step having a specific shortening distance of $\Delta h = 5$ mm. Performing a judgment according the following inequality:

$h > h_0.$

If the inequality holds, the subsurface defect detection of the workpiece to be detected is not completed, and performing S3.1 and S3.2 repeatedly.

If the inequality does not hold, the subsurface defect detection of the workpiece to be detected is considered complete.

S4, analyzing collected laser ultrasonic signals by the PC terminal 12. Determining whether the workpiece to be detected has the subsurface defect by observing variations in positive peak values of the Rayleigh wave in the collected laser ultrasonic signals. And then, calibrating a location of the subsurface defect based on the workpiece rotation angles and the measurement heights. Further, calibrating a subsurface defect depth d by calculating a depth feature value $p_r$ of the Rayleigh wave in the laser ultrasonic signals. Extracting positive peak value $R_{pos}$ and negative peak value $R_{neg}$ of the Rayleigh wave in the laser ultrasonic signals, and calculating a subsurface defect width w.

Specifically, S4 includes the following steps.

S4.1, calibrating a time-domain and a frequency-domain of the laser ultrasonic signals for the workpiece to be detected in a defect-free state.

S4.2, comparing the peak values of the collected laser ultrasonic signals in S3 with the calibrated laser ultrasonic signals from S4.1. Marking the rotational angles $\alpha_1$, $\alpha_2$, $\alpha_3$ and $\alpha_4$, where $\alpha_1$ represents a rotational angle at which the subsurface defect starts to enter the detection area, $\alpha_2$ represents a rotational angle at which the subsurface defect completely enters the detection area, $\alpha_3$ represents a rotational angle at which the subsurface defect begins to shift out the detection area, and $\alpha_4$ represents a rotational angle at which the subsurface defect completely shifts out the detection area. And $\alpha_1$ corresponds to a maximum positive peak value of the Rayleigh wave peak curve, $\alpha_2$ and $\alpha_3$ correspond to two negative peak values in a Rayleigh wave peak curve, and $\alpha_4$ corresponds to the Rayleigh wave positive peak value which increases from a minimum value to a positive value of the Rayleigh wave positive value of the defect-free state calibrated in S41. The detection area is a sector-shaped region between the pulse laser focusing probe 7 and the continuous laser focusing probe 11. A circumferential position of the subsurface defect is calibrated based on the rotational angles and the measurement heights of the workpiece to be detected.

S4.3, if it is determined by comparing the peak values of S41 that the subsurface defect is present at the corresponding position of the laser ultrasonic signal, the subsurface defect depth d is calibrated by calculating the depth feature value $p_r$ of the Rayleigh wave in the laser ultrasonic signal through the PC terminal 12. Specifically, S4.3 includes the following steps.

S4.3.1, performing a wavelet packet decomposition to the laser ultrasonic signal, and the laser ultrasonic signal $\varphi(t)$ is expressed as:

$$C_{i,k}{}^j = \int \varphi(t) \cdot W_{i,k}(t) dt;$$

$$W_{i,k}(t) = 2^{-i/2} W(2^{-i} t - k);$$

where, t is a time series, i is a frequency band order, j is a wavelet decomposition level, k is a wavelet packet decomposition parameter, and C is a wavelet packet function, and $W_{i,k}(t)$ is a wavelet packet decomposition coefficient.

S4.3.2, constructing a time-frequency matrix A of the laser ultrasonic signal that contains information about subsurface defect through the wavelet packet decomposition, and the time-frequency matrix A is expressed as follow:

$$A = \begin{bmatrix} C_{11} & C_{12} & \cdots & C_{1b} \\ C_{21} & C_{22} & \cdots & C_{2b} \\ \vdots & \vdots & \ddots & \vdots \\ C_{a1} & C_{a2} & \cdots & C_{ab} \end{bmatrix};$$

where, $a = N/2^j$, $b = 2^j$, N is a number of sampling points of the laser ultrasonic signal $\varphi(t)$.

S4.3.3, $A = U \Sigma V^T$.

where, T is a matrix transpose operator, U is a orthogonal matrix of a×a, and V is a orthogonal matrix of b×b, and $\Sigma$ is the diagonal matrix of a×b;

where, $$\sum = \begin{bmatrix} \lambda_1 & 0 & \cdots & 0 \\ 0 & \lambda_2 & \cdots & 0 \\ \vdots & \vdots & \ddots & 0 \\ 0 & 0 & 0 & \lambda_r \end{bmatrix};$$

where, $\lambda$ is eigenvalues of a rank of the time-frequency matrix A, and the rank of the time-frequency matrix A is denoted as r=rank(A).

Calculating the depth feature value $p_r$ of the Rayleigh wave in the laser ultrasonic signal;

where, $$p_r = \frac{\lambda_1 + \lambda_2 + \ldots + \lambda_r}{r}.$$

Computing the subsurface defect depth d, where $d = A_1 \cdot p_r$, and $A_1$ is a correction factor.

S4.4, averaging the laser ultrasonic signals within the angular range from $\alpha_2$ to $\alpha_3$ through the PC terminal, and extracting positive peak value $R_{pos}$ and negative peak value $R_{neg}$ of the Rayleigh wave in the laser ultrasonic signals. Calculating a subsurface defect width w using a width feature value $|R_{neg}/R_{pos}|$ and the subsurface defect width w is calculated according to the following formula:

$$w = \frac{2\pi}{d} \arctan\left( \left| \frac{R_{neg}}{R_{pos}} \right| \right).$$

S5, outputting subsurface defect information of the workpiece to be detected, and the subsurface defect information includes whether the subsurface defect is present, the location of the subsurface defect on the workpiece to be detected, the subsurface defect depth, and the subsurface defect width.

In addition, the PC terminal includes: a processor (such as Central Processing Unit, CPU), a communication bus, an input port, an output port, and a memory. Among them, the communication bus is used to achieve connection communication between these components; the input port is used for data input; and the output port is used for data output, and the memory can be high-speed RAM memory or non volatile memory, such as disk memory, non-transitory computer-readable storage medium. Optionally, memory is a storage device independent of the aforementioned processor.

The memory, as a non-volatile readable storage medium, may include an operating system, network communication module, application program module, and a subsurface defect detecting program for cylindrical components. The network communication module is mainly used to connect to servers and communicate data with them; And processor is used to call the program to process the method stored in memory, and execute relative steps of the subsurface defect detecting method for cylindrical components mentioned above.

The above displays and describes the main features and advantages of the present disclosure. For those skilled in the art, it is apparent that the disclosure is not limited to the details of the exemplary embodiments described, and can be implemented in other specific forms without departing from the spirit or essential characteristics of the disclosure. Therefore, the embodiments should be considered as illustrative and not restrictive. The scope of the disclosure is defined by the appended claims rather than the foregoing description, and it is intended to encompass all modifications that fall within the meaning and scope of the equivalent elements of the claims.

Furthermore, it should be understood that although the description is provided in terms of embodiments, not every embodiment contains a single independent technical solution. This manner of description is merely for clarity. Those skilled in the art should interpret the specification as a whole, and the technical solutions in various embodiments may be appropriately combined to form other embodiments that can be understood by those skilled in the art.

What is claimed is:

1. A subsurface defect detecting method for cylindrical components, the subsurface defect detecting method for the cylindrical components is applied to a subsurface defect detecting device for the cylindrical components, wherein, the subsurface defect detecting device for the cylindrical components comprising an electric rotating platform, a three-jaw chuck, a first linear supporting base, and a second linear supporting base;

wherein the three-jaw chuck being mounted on the electric rotating platform, and the three-jaw chuck is configured to fix a workpiece to be detected; and the first linear supporting base and the second linear supporting base being arranged close to the electric rotating platform, and the first linear supporting base and the second linear supporting base are in contact with each other and are perpendicular to each other; and a first electric telescopic rod being installed on a slider of the first linear supporting base, and a second electric telescopic rod being fixed at an upper end of the first electric telescopic rod; and the second electric telescopic rod is perpendicular to the first linear supporting base and parallel to the second linear supporting base; and a pulse laser focusing probe being fixed at a movable end of the second electric telescopic rod; and a rotating base being mounted on a slider of the second linear supporting base, and a third electric telescopic rod is rotatably mounted on the rotating base; and a fourth electric telescopic rod being fixed at an upper end of the third electric telescopic rod, and a continuous laser focusing probe being fixed at a movable end of the fourth electric telescopic rod; and the electric rotating platform, the first linear supporting base, the second linear supporting base, the first electric telescopic rod, the second electric telescopic rod, the third electric telescopic rod, and the fourth electric telescopic rod being communicated with a personal computer (PC) terminal; and the PC terminal being communicated with a control terminal of the pulse laser and an output terminal of a dual-wave mixing interferometer; and the pulse laser is connected to the pulse laser focusing probe to emit pulse laser, and the dual-wave mixing interferometer is connected to the continuous laser focusing probe to convert laser ultrasonic signals received by the continuous laser focusing probe into electrical signals and transmit them to the PC terminal;

wherein, the subsurface defect detecting method for the cylindrical components comprising:

S1, installing the workpiece to be detected, and establishing a plane rectangular coordinate system (x-y) with an intersection of the first linear supporting base and the second linear supporting base as a coordinate origin, and the first linear supporting base is located on the y-axis, and the second linear supporting base is located on the x-axis; and setting coordinates of the first electric telescopic rod in the x-y plane rectangular coordinate system to (0, y), and setting coordinates of the third electric telescopic rod in the x-y plane rectangular coordinate system to (x, 0), and setting coordinates of the workpiece to be detected in the x-y plane rectangular coordinate system to $(x_0, y_0)$; and S2, adjusting a position of the pulse laser focusing probe, and adjusting a position and an angle of the continuous laser focusing probe to ensure that the laser ultrasonic signal received by the continuous laser focusing probe is optimal; and S3, performing a layer-by-layer scanning of the workpiece to be detected through a cooperation of the electric rotating platform, the first electric telescopic rod, and the third electric telescopic rod, while synchronously recording rotational angles and measurement heights of the workpiece to be detected and corresponding laser ultrasonic signals; and S4, analyzing collected laser ultrasonic signals by the PC terminal; and determining whether the workpiece to be detected has the subsurface defect by observing variations in positive peak values of the Rayleigh wave in the collected laser ultrasonic signals; and calibrating a location of the subsurface defect based on the workpiece rotation angles and the measurement heights; and calibrating a subsurface defect depth d by calculating a depth feature value $p_r$ of the Rayleigh wave in the laser ultrasonic signals; and extracting positive peak value $R_{pos}$ and negative peak value $R_{neg}$ of the Rayleigh wave in the laser ultrasonic signals, and calculating a subsurface defect width w;

wherein, S4 comprises the following steps:

S4.1, calibrating a time-domain and a frequency-domain of the laser ultrasonic signals for the workpiece to be detected in a defect-free state;

S4.2, comparing the peak values of the laser ultrasonic signals collected in S3 with the calibrated laser ultrasonic signals from S41; and marking the rotational angles $\alpha_1$, $\alpha_2$, $\alpha_3$ and $\alpha_4$, where $\alpha_1$ represents a rotational angle at which the subsurface defect starts to enter the detection area, $\alpha_2$ represents a rotational angle at which the subsurface defect completely enters the detection area, $\alpha_3$ represents a rotational angle at which the subsurface defect begins to shift out the detection area, and $\alpha_4$ represents a rotational angle at which the subsurface defect completely shifts out the detection area; and $\alpha_1$ corresponds to a maximum positive peak value of the Rayleigh wave peak curve, $\alpha_2$ and $\alpha_3$ correspond to two negative peak values in a Rayleigh wave peak curve, and $\alpha_4$ corresponds to the Rayleigh wave positive peak value which increases from a minimum value to a positive value of the Rayleigh wave positive value of the defect-free state calibrated in S41; and the detection area is a sector-shaped region between the pulse laser focusing probe and the continuous laser focusing probe; and a circumferential position of the subsurface defect is calibrated based on the rotational angles and the measurement heights of the workpiece to be detected; and S4.3, if it is determined by comparing the peak values of S41 that the subsurface defect is present at the corresponding position of the laser ultrasonic signal, the subsurface defect depth d is calibrated by calculating the depth feature value $p_r$ of the Rayleigh wave in the laser ultrasonic signal through the PC terminal;

wherein, S4.3 comprises the following steps:

S4.3.1, performing a wavelet packet decomposition to the laser ultrasonic signal, and the laser ultrasonic signal $\varphi(t)$ is expressed as:

$$C_{i,k}{}^j = \int \varphi(t) \cdot W_{i,k}(t) dt;$$

$$W_{i,k}(t) = 2^{-i/2} W(2^{-i}t - k);$$

where, t is a time series, i is a frequency band order, j is a wavelet decomposition level, k is a wavelet packet decomposition parameter, and C is a wavelet packet function, and $W_{i,k}(t)$ is a wavelet packet decomposition coefficient;

S4.3.2, constructing a time-frequency matrix A of the laser ultrasonic signal that contains information about subsurface defect through the wavelet packet decomposition, and the time-frequency matrix A is expressed as follow:

$$A = \begin{bmatrix} C_{11} & C_{12} & \ldots & C_{1b} \\ C_{21} & C_{22} & \ldots & C_{2b} \\ \vdots & \vdots & \ddots & \vdots \\ C_{a1} & C_{a2} & \ldots & C_{ab} \end{bmatrix};$$

where, $a = N/2^j$, $b = 2^j$, N is a number of sampling points of the laser ultrasonic signal $\varphi(t)$;

S4.3.3, $A = U\Sigma V^T$;

where, T is a matrix transpose operator, U is a orthogonal matrix of a×a, and V is a orthogonal matrix of b×b, and $\Sigma$ is the diagonal matrix of a×b;

where, $$\Sigma = \begin{bmatrix} \lambda_1 & 0 & \ldots & 0 \\ 0 & \lambda_2 & \ldots & 0 \\ \vdots & \vdots & \ddots & 0 \\ 0 & 0 & 0 & \lambda_r \end{bmatrix};$$

where, $\lambda$ is eigenvalues of a rank of the time-frequency matrix A, and the rank of the time-frequency matrix A is denoted as r = rank(A);

calculating the depth feature value $p_r$ of the Rayleigh wave in the laser ultrasonic signal;

where, $$p_r = \frac{\lambda_1 + \lambda_2 + \ldots + \lambda_r}{r};$$

computing the subsurface defect depth d, where $d = A_1 \cdot p_r$, and $A_1$ is a correction factor;

S4.4, averaging the laser ultrasonic signals within the angular range from $\alpha_2$ to $\alpha_3$ through the PC terminal, and extracting positive peak value $R_{pos}$ and negative peak value $R_{neg}$ of the Rayleigh wave in the laser ultrasonic signals, and calculating a subsurface defect width w using a width feature value $|R_{neg}/R_{pos}|$ and the subsurface defect width w is calculated according to the following formula:

$$w = \frac{2\pi}{d} \arctan\left(\left|\frac{R_{neg}}{R_{pos}}\right|\right);$$

S5, outputting subsurface defect information of the workpiece to be detected, and the subsurface defect information comprises whether the subsurface defect is present, the location of the subsurface defect on the workpiece to be detected, the subsurface defect depth, and the subsurface defect width.

2. The subsurface defect detecting method for cylindrical components according to claim 1, wherein, the rotating base is fixedly mounted with a rotating motor, and a worm gear is fixedly connected to an output shaft of the rotating motor; and a endless screw is meshed with a worm gear, and the worm gear is fixedly connected to a cylinder body of third electric telescopic rod.

3. The subsurface defect detecting method for cylindrical components according to claim 1, wherein, S2 comprises the following steps:

S2.1, adjusting an extension length of the first electric telescopic rod and the third electric telescopic rod so that the pulsed laser focusing probe and the continuous laser focusing probe are at a same horizontal height as an upper surface of the workpiece to be detected; that is, $$h_0 + l_1 = h;$$

where, $h_0$ is a height of the upper surface of the three-jaw chuck, $l_1$ is a distance between the upper surface of the workpiece to be detected and the upper surface of the three-jaw chuck, and h is a height of the pulsed laser focusing probe and continuous laser focusing probe; and S2.2, adjusting the extension length of the first electric telescopic rod and the third electric telescopic rod, to lower the pulsed laser focusing probe and continuous laser focusing probe by 2 mm; and S2.3, adjusting a position of the first electric telescopic rod through the first linear supporting base, and moving the first electric telescopic rod to a coordinate point (0, $y_0$), making the pulsed laser focusing probe aligned with the workpiece to be detected;

S2.4, adjusting the extension length of the second electric telescopic rod, allowing the pulsed laser focusing probe emits a pulsed laser and forms a line spot on the surface of the workpiece to be detected with a size of 4 mm×0.5 mm; and the line spot is parallel to an axis of the workpiece to be detected; and S2.5, adjusting a position and an angle of the continuous laser focusing probe;

wherein, S2.5 comprises the following steps:

S2.5.1, moving the third electric telescopic rod to the coordinate origin through the second linear supporting base; and S2.5.2, adjusting an angle of fourth electric telescopic rod using the rotating motor, to allow the continuous laser focusing probe faces the coordinate point ($x_0$, $y_0$) of the workpiece to be detected; and the coordinate points ($x_0$, $y_0$), ($x_0$, 0), and ($x_0$, 0) form a right triangle, where the coordinate point (x, 0) is the coordinate of the third electric telescopic rod; making the continuous laser focusing probe is aligned with the axis of the workpiece to be detected, an angle between fourth electric telescopic rod and the second linear supporting base satisfies the following formal:

$$\varphi = \arctan\left(\frac{x_0 - x}{y_0}\right);$$

S2.5.3, adjusting an extension length of the second linear supporting base to allow the continuous laser focusing probe emits a continuous laser and forms a circular light spot with a diameter of 2 mm on the surface of the workpiece to be detected; and S2.5.4, controlling the pulse laser to emit a pulsed laser via the pulsed laser focusing probe, and exciting laser ultrasound on the surface of the workpiece to be detected; collecting the laser ultrasound signal through the continuous laser focusing probe, and laser ultrasound signal is then converted into an electrical signal by the dual-wave mixing interferometer and transmitted to the PC terminal; and the PC terminal is configured to store the laser ultrasound signal and to record the corresponding coordinate of third electric telescopic rod; and S2.5.5, stepping the third electric telescopic rod along a positive x-axis through the second linear supporting base, repeating S2.5.2 to S2.5.5 until $(m+1)\cdot\Delta x > x_{max}$, where $x_{max}$ is a length of the second linear supporting base, and m is a number of steps of the third electric telescopic rod along the x-axis;

S2.5.6, analyzing the collected laser ultrasound signals by the PC terminal, extracting the positive peak value $R_{pos}$ and the negative peak value $R_{neg}$ of the Rayleigh wave in the laser ultrasound signals; when the maximum value of $R_{pos}/R_{neg}$ is taken, the coordinate point of the third electric telescopic rod at $(x_1, 0)$ is marked as an optimal detection position; moving the third electric telescopic rod to the coordinate point $(x_1, 0)$ by the second linear supporting base, then repeat S2.5.2 and S2.5.3 to adjust the position and the angle of the continuous laser focusing probe.

4. The subsurface defect detecting method for cylindrical components according to claim 1, wherein, S3 comprises the following steps:

S3.1, driving the workpiece to be detected to rotate in steps by the electric rotating platform, with each step involving a specific rotation angle of $\Delta\theta=2°$; after each step, the pulse laser is controlled to emit a pulse laser through the pulse laser focusing probe; and collecting the laser ultrasound signals from current position by the continuous laser focusing probe; and converting the laser ultrasound signals into electrical signals by the dual-wave mixing interferometer and the electrical signals are transmitted to the PC terminal; and the PC terminal is configured to store the laser ultrasound signals and records the corresponding rotation angles and measurement heights of the workpiece to be detected, until $n\cdot\Delta\theta=360°$, where n represents the number of rotation steps of the electric rotary platform; and S3.2, synchronously shorting the first electric telescopic rod and the third electric telescopic rod in steps, with each step having a specific shortening distance of $\Delta h=5$ mm; performing a judgment according the following inequality:

$h > h_0;$ if the inequality holds, the subsurface defect detection of the workpiece to be detected is not completed, and performing S3.1 and S3.2 repeatedly;

if the inequality does not hold, the subsurface defect detection of the workpiece to be detected is considered complete.

* * * * *